United States Patent
Agger et al.

(10) Patent No.: US 9,940,001 B2
(45) Date of Patent: Apr. 10, 2018

(54) DRAG AND RELEASE NAVIGATION

(71) Applicant: ID2me A/S, Birkerød (DK)

(72) Inventors: Christina Agger, Hørsholm (DK); Kasper Larsen, Malmö C (SE); Dennis Høedt Thomsen, København Ø (DK)

(73) Assignee: CAMAR ApS, Allerød (DK)

( * ) Notice: Subject to any disclaimer, the term of this patent is extended or adjusted under 35 U.S.C. 154(b) by 0 days.

(21) Appl. No.: 14/969,425

(22) Filed: Dec. 15, 2015

(65) Prior Publication Data
US 2017/0168681 A1 Jun. 15, 2017

(51) Int. Cl.
*G06F 3/0484* (2013.01)
*G06F 3/0486* (2013.01)
*G06F 3/0488* (2013.01)
*H04M 1/725* (2006.01)
*G06F 3/0481* (2013.01)

(52) U.S. Cl.
CPC ........ *G06F 3/04842* (2013.01); *G06F 3/0486* (2013.01); *G06F 3/0488* (2013.01); *G06F 3/04817* (2013.01); *H04M 1/72522* (2013.01)

(58) Field of Classification Search
CPC ...... G06F 3/041–3/047; G06F 3/04817; G06F 3/0482; G06F 3/04842; G06F 3/0486; G06F 3/0488; H04M 1/72522
USPC ......... 345/173–178; 178/18.01–18.09, 18.11
See application file for complete search history.

(56) References Cited

U.S. PATENT DOCUMENTS

| | | | | |
|---|---|---|---|---|
| 7,834,861 B2 * | 11/2010 | Lee | ........................ | G06F 3/0482 345/173 |
| 2006/0146039 A1 * | 7/2006 | Prados | .................... | G06F 3/016 345/173 |
| 2007/0236476 A1 * | 10/2007 | Suzuki | ................ | G06F 3/04883 345/173 |
| 2011/0296351 A1 | 12/2011 | Ewing, Jr. et al. | | |
| 2013/0024808 A1 | 1/2013 | Rainisto | | |
| 2013/0176298 A1 | 7/2013 | Lee et al. | | |
| 2014/0026099 A1 * | 1/2014 | Andersson Reimer | ............... | G06F 3/04883 715/825 |
| 2014/0082554 A1 | 3/2014 | Iwaniszczuk et al. | | |
| 2015/0309573 A1 * | 10/2015 | Brombach | ............. | B60K 37/02 715/702 |

FOREIGN PATENT DOCUMENTS

| | | |
|---|---|---|
| EP | 2503444 | 9/2012 |
| WO | WO2007/076210 | 7/2007 |

* cited by examiner

*Primary Examiner* — Stephen Sherman
(74) *Attorney, Agent, or Firm* — McHale & Slavin, P.A.

(57) ABSTRACT

A computer-implemented method for controlling a portable electronic device comprising a touch-sensitive display is disclosed. The computer-implemented method allows the portable electronic device to detect contact and movement of contact on the touch-sensitive display, and in response to the detected contact and movement of content to browse and select categories of elements and elements. Accordingly, a user may be allowed to select a specific element belonging to a specific category by use of only one contact with the touch-sensitive display.

7 Claims, 6 Drawing Sheets

DRAG AND RELEASE NAVIGATION

FIELD OF THE INVENTION

The present invention relates to a user interface for navigating portable electronic devices comprising a touch-sensitive display.

BACKGROUND OF THE INVENTION

User interaction and navigation is generally different on modern day portable electronic devices with touch-sensitive displays than it is on computers with user interfaces comprising mouse and keyboard. The birth of smartphones and tablets with touch-sensitive displays also paved the way for rethinking the way an operating system is designed. All major label present day smartphones and tablets rely on program or application icons and widgets that may be brought about and rearranged by contact between the touch-sensitive screen and, e.g., the finger of a user.

To launch an application, the user generally tabs the icon corresponding to a particular application. As more applications are installed, the number of icons representing applications may exceed the number of icons that fit into the touch-sensitive display of the portable electronic device at one time. To enable navigation of more applications, many portable electronic devices allow the user to navigate among several pages of icons by swiping across the touch-sensitive display. In this way, to launch an application on a different page than the one currently presented to the user, the user first swipes the touch-sensitive display to reach the page containing the relevant icon and then tabs the icon, thereby launching the application represented by the icon.

As an alternative or additionally to arranging icons on several pages, icons and their associated applications may be arranged in categories or groups. These categories or groups may be represented by category icons. To launch an application associated with a particular category, the user may initially have to reach the page containing the category icon, tab the category icon, and finally tab the icon representing the desired application. As the number of applications installed on portable electronic devices grows, the increase in number of categories and pages available to the user complicates the process of launching a particular application. Moreover, it takes time to navigate the pages and categories and it may be hard to remember on which page and in which category an application is launched from. While search options are available on some portable electronic devices, they require writing at least part of the name of the desired application, which may also be a time consuming process.

WO 2007/076210 A1 discloses a device with a touch-sensitive display which may be unlocked via gestures performed on the touch-sensitive display. The device is unlocked if contact with the display corresponds to a predefined gesture for unlocking the device. The device displays one or more unlock images with respect to which the predefined gesture is to be performed in order to unlock the device. The performance of the predefined gesture with respect to the unlock image may include moving the unlock image to a predefined location and/or moving the unlock image along a predefined path.

DESCRIPTION OF THE INVENTION

It is an object of embodiments of the invention to provide a computer-implemented method of controlling a portable electronic device comprising a touch-sensitive display in a time efficient and convenient manner.

It is a further object of embodiments of the invention to provide a computer-implemented method of controlling a portable electronic device comprising a touch-sensitive display in a manner which enables navigating a sequence of categories and elements contained therein by movement of a contact on the touch-sensitive display.

It is an even further object of embodiments of the invention to provide a portable electronic device comprising a touch-sensitive display, which can be controlled in a time efficient and convenient manner.

According to a first aspect the invention provides a computer-implemented method of controlling a portable electronic device comprising a touch-sensitive display, the method comprising the steps of:
 detecting contact with the touch-sensitive display,
 detecting continuous movement of the contact along a first direction,
 in response to the detected continuous movement of the contact along the first direction, the portable electronic device consecutively presenting a sequence of graphical representations of categories of elements on the touch-sensitive display,
 detecting a change in direction of the continuous movement of the contact from the first direction to a second direction being different from the first direction,
 in response to the detected change in direction of the continuous movement of the contact, the portable electronic device selecting a currently presented category of elements, and consecutively presenting a sequence of graphical representations of elements of the selected category on the touch-sensitive display.

The computer-implemented method according to the first aspect of the invention is for controlling a portable electronic device comprising a touch-sensitive display. In the present context the term "portable electronic device" should be interpreted to mean any electronic device which is portable. Examples of common portable electronic devices comprising a touch-sensitive display are smartphones, tablets and laptops. However, here portable should be interpreted in the broadest possible sense so that the invention may also apply to other kinds of electronic devices, such as remote controls, car user interfaces, etc.

In the present context the term "touch-sensitive" display should be interpreted to mean a display which allows navigation by means of a user touching the display. For instance, the touch-sensitive display may apply a capacitive technology.

According to the method of the first aspect of the invention, contact with the touch-sensitive display is initially detected. Thus, it is initially detected that a user is touching the touch-sensitive display, e.g. by means of a finger.

Subsequently, a continuous movement of the contact along a first direction is detected. In the present context the term "continuous movement of the contact" should be interpreted to mean that the user moves the point of contact with the touch-sensitive display, e.g. a finger, across the touch-sensitive display, without interrupting the contact with the touch-sensitive display, i.e. without removing, e.g., the finger from the touch-sensitive display.

The first direction is a direction along the touch-sensitive display, i.e. relative to the outline of the touch-sensitive display, which has been defined previously. Accordingly, when the user moves, e.g. a finger, substantially along this predefined direction, while contacting the touch-sensitive display, the portable electronic device recognises this as a continuous movement of a contact along the first direction.

In response to detecting continuous movement of a contact along the first direction, the portable electronic device consecutively presents a sequence of graphical representations of categories of elements on the touch-sensitive display. Thus, graphical representations of a number of categories of elements are presented on the touch-sensitive display, one after the other. For instance, the graphical representations of the categories may be presented one at a time, in a predefined order. As an alternative, the graphical representations of the categories may be presented in such a manner that they move across the touch-sensitive display, e.g. linearly, along a circle or in any other suitable pattern. In this case the graphical representations of the categories may advantageously be highlighted and/or enlarged consecutively, i.e. only one of the categories is highlighted and/or enlarged at a given time, even though graphical representations of two or more categories are presented on the touch-sensitive display. The sequence of categories of elements continues to be presented as long as the contact is moved along the first direction. Thereby the categories of elements may be browsed by the user as the user continuously moves, e.g., a finger across the touch-sensitive display along the first direction.

The graphical representations of the categories of elements may, e.g., be or comprise icons and/or written names associated with the respective categories.

At least some of the categories of elements may be user defined and/or at least some of the categories of elements may be predefined and/or at least some of the categories of elements may be defined by the portable electronic device. In the present context the term "define" should be interpreted to mean assigning one or more elements to a given category of elements. For instance, a given category may have a number of elements of the same or similar kind assigned thereto. Alternatively or additionally, one of the categories may have a number of elements which have been accessed or activated most recently assigned thereto.

The elements of the categories may, e.g., be applications or functions available on the portable electronic device. As an alternative, at least some of the elements may be settings of the portable electronic device.

Next, a change in direction of the continuous movement of the contact from the first direction to a second direction being different from the first direction is detected. The second direction may, e.g., be substantially perpendicular to the first direction. However, an angle defined between the first direction and the second direction may differ from 90°.

In response to the detected change in direction of the continuous movement of the contact, the portable electronic device selects the currently presented category of elements, i.e. the category of elements which is presented or highlighted on the touch-sensitive display when the change in direction of the continuous movement of the contact is detected, is selected. When the category of elements has been selected, the portable electronic device consecutively presents a sequence of graphical representations of elements of the selected category on the touch-sensitive display. This is similar to the situation described above with respect to the graphical representations of the categories of elements, except in this case the elements of the selected category are presented. Thus, the elements of the selected category of element may be browsed by a user as the user moves, e.g., a finger across the touch-sensitive display along the second direction.

Accordingly, a given element may be reached by moving the contact with the touch-sensitive display in a specific moving pattern.

The graphical representations of elements may, e.g., be or comprise icons and/or written names associated with the respective elements.

In summary, according to the computer implemented method of to the first aspect of the invention, a portable electronic device may be controlled by the touch of, e.g., a finger. In response to detection of a contact followed by continuous movement along the first direction, the portable electronic device consecutively presents a sequence of graphical representations of categories of elements on the touch-sensitive display, and the consecutive presentation of the categories continues as long as the contact is moved along the first direction. As the contact is moved, different graphical representations of categories are presented. In this way, many categories may be browsed with a single contact in a time efficient manner. Continuous movement of contact along the first direction associated with consecutive presentation of categories may also be referred to as category mode. In this case the portable electronic device is in category mode.

Furthermore, in response to detection of change in direction of the continuous movement of the contact from the first direction to a second direction, the portable electronic device selects a currently presented category and consecutively presents a sequence of graphical representations of elements of the selected category. The detection of a change in direction implies that no loss of contact is detected between the steps. As the direction of continuous movement changes from the first to the second direction, the portable electronic device selects the currently presented category. Further continuous movement in the second direction causes the portable electronic device to consecutively present graphical representations of elements of the selected category. Again, as the contact is moved, different elements are presented. Continuous movement of contact along the second direction associated with consecutive presentation of elements may also be referred to as element mode. In this case the portable electronic device is in element mode.

The method according to present invention, thus, allows for navigation among numerous categories and elements with a single contact on the touch-sensitive display. Accordingly, it is not necessary to apply a series of gestures including, e.g., swipes and taps to navigate categories and elements on a portable electronic device. This saves time for the user and adds to the convenience associated with navigating the portable electronic device.

Furthermore, all categories and associated elements may be navigated by use of only a part of the touch-sensitive display. For instance, movement of the contact along the first and second direction may be done in, e.g., the lower part of the touch-sensitive display which is easily accessible by the thumb of the user. This is particularly useful for touch-sensitive displays with dimensions exceeding the reach of the thumb. Previously, for such large displays, navigation on the portable electronic devices may have necessitated change of grip on the portable electronic device and/or use of more than one hand. Such change of grip and/or use of more than one hand may be inconvenient and time consuming for the user. Thus the method according to the first aspect of the present invention may even further save time and add to the convenience in relation to navigating the portable electronic device.

The computer-implemented method may further comprise the steps of detecting end of continuous contact following detection of continuous movement of contact along the second direction, and in response to the detected end of continuous contact, the portable electronic device selecting a currently presented element.

In this case, the portable electronic device selects the currently presented element when continuous contact with the touch-sensitive display is ended following detection of movement of the contact along the second direction. In other words, the portable electronic device selects the presented element when contact is ended in element mode. Thus, for the user, selecting an element entails to simply end the continuous contact by, e.g., removing the finger from the touch-sensitive display when the portable electronic device is in element mode, and when the desired element is presented. Moreover, selection of an element may be done by first continuously moving the contact in the first direction until the desired category is presented by the portable electronic device, at which point the contact is continuously moved in the second direction until the desired element is presented, followed by end of the contact to select the currently presented element. This allows a user to select a specific element in a specific category with a single contact in a highly time efficient and convenient manner. Thus, an element may be selected by moving the contact with the touch-sensitive display in a specific moving pattern along the touch-sensitive display.

In the case that the element is an application or function available on the portable electronic device, the selection of an element may result in the portable electronic device executing, launching and/or presenting the application or function.

The computer-implemented method may further comprise the steps of detecting end of continuous contact following detection of continuous movement of contact along the first direction, and in response to the detected end of continuous contact, the portable electronic device selecting a currently presented category and presenting graphical representations of the elements of the selected category on the touch-sensitive display.

In this case, continuous movement of contact along the first direction followed by end of contact causes the portable electronic device to select the category presented at the time when continuous contact is ended. Furthermore, the portable electronic device presents graphical representations of the elements of the selected category. In other words, the portable electronic device selects the presented category and presents graphical representations of the elements assigned thereto when contact is ended in category mode. This allows the user to select a category and gain an overview of the elements in the category by use of just one contact. This may be particularly advantageous if the user has forgotten the name of the element and/or the appearance of the graphical representation of the element and thus may benefit from having time to scrutinize an overview of graphical representations of the elements of a given category.

The computer-implemented method may further comprise the steps of detecting a change in direction of the continuous movement of the contact from the second direction to the first, and in response to the detected change in direction of the continuous movement of the contact, the portable electronic device consecutively presenting a sequence of graphical representations of categories of elements on the touch-sensitive display.

In this case, continuous movement of contact along the second direction followed by continuous movement of contact along the first direction causes the portable electronic device to consecutively present a sequence of graphical representations of categories of elements on the touch-sensitive display. That is, the portable electronic device changes from element mode to category mode when the direction of movement of contact changes from the second to the first direction. This is particularly advantageous as the portable electronic device is able to quickly activate category mode after having been in element mode, by the user changing direction of movement of contact. If the user desires to browse a category different from the currently selected, the user may reach the desired category by returning to category mode. The user can, thus, quickly and conveniently change between selected categories in order to browse the categories and/or select a specific element belonging to a specific category.

The computer-implemented method may further comprise the step of the portable electronic device providing tactile feedback in response to continuous movement of the contact along the first direction and/or along the second direction.

In this case, the portable electronic device provides tactile feedback in response to movement of the contact along the first direction and/or along the second direction. Accordingly, the portable electronic device may provide tactile feedback in response to movement of the contact in category mode and/or in element mode. In this way the portable electronic device is able to indicate receipt of user input by other means than visual output on the touch-sensitive display. This is particularly advantageous as the user is then able to get a sense of what input the portable electronic device receives without the user needing to have visual contact with the touch-sensitive display.

The user may also be able to associate a given user input with the received tactile feedback. This may allow the user to build up so-called "muscle memory". Muscle memory is a term used to describe the brain's and thus muscles' ability to react to tactile feedback in a swift manner without the need to "think". An in depth neurological explanation for muscle memory will not be presented here. A simple example will be given, though. When learning how to ride a bicycle it is necessary to think about how to keep balanced, going forward, braking, etc. However, once riding a bicycle has been familiarized there is no longer a need to think about how to keep balanced, going forward, braking, etc. The brain and body will automatically react to feedback received by the body and perform necessary measures in order to ride the bicycle. This is the kind of muscle memory being referred to here, and the kind which may become possible to achieve when the portable electronic device gives tactile feedback in response to movement of the contact along the first direction and/or along the second direction.

The computer-implemented method may further comprise the step of the portable electronic device providing tactile feedback in response to a change in currently presented category and/or element.

In this case, the portable electronic device uses tactile feedback to inform the user of a change in presented category and/or presented element. This provides the user with a simple way of registering each time the presented category and/or element is changed. The user may then count the number of tactile feedbacks in category mode to reach the desired category, change to element mode and count the number of tactile feedbacks in element mode to reach the desired element. In time, it may also be possible for the user to build up muscle memory as described above. The brain then may be able to, e.g., automatically change from category mode to element mode when the correct number of tactile feedbacks has been sensed.

The tactile feedback may, e.g., be in the form of a vibration. This is particularly advantageous as implementing a vibrator in a portable electronic device is known in the art and already present in many of the portable electronic devices existing today. Accordingly, it is a cost effective way of enabling tactile feedback. Furthermore, because vibrators are already used to provide tactical feedback in response to, e.g., incoming phone calls, messages and/or notifications it may be relatively easy for the user to build up muscle memory in response to receipt of vibrational signals.

The computer-implemented method may further comprise the step of providing tactile feedback in response to change of direction of movement of contact from the first direction to the second direction and/or in response to change of direction of movement of contact from the second direction to the first direction. In this way the user is able to sense change from category mode to element mode and/or change from element mode to category mode. The tactile feedback provided in response to a change in direction of movement of contact may be distinguishable from the tactile feedback provided in response to a change in presented category or element, thereby allowing the user to determine, based on the received tactile feedback, whether a change in presented category or element, or a change in mode has occurred.

According to a second aspect the invention provides a portable electronic device comprising a touch-sensitive display, one or more processors, memory, and one or more programs, wherein the one or more programs are stored in the memory and configured to be executed by the one or more processors, the program(s) including instructions for:
- detecting contact with the touch-sensitive display,
- detecting continuous movement of the contact along a first direction,
- in response to the detected continuous movement of the contact along the first direction, consecutively presenting a sequence of graphical representations of categories of elements on the touch-sensitive display,
- detecting a change in direction of the continuous movement of the contact from the first direction to a second direction being different from the first direction,
- in response to the detected change in direction of the continuous movement of the contact, selecting a currently presented category of elements, and consecutively presenting a sequence of graphical representations of elements of the selected category on the touch-sensitive display.

It should be noted that a person skilled in the art would readily recognise that any feature described in combination with the first aspect of the invention could also be combined with the second aspect of the invention, and vice versa. The remarks set forth above are therefore equally applicable here.

According to this aspect of the invention, a portable electronic device is provided with one or more programs that are stored in a memory and may be executed by one or more processors of the portable electronic device. The program(s) include(s) instructions for detecting contact made with the touch-sensitive display and performing tasks in response to movement of the contact. Accordingly, the portable electronic device is configured to detect contact with the touch-sensitive display, further detect continuous movement of the contact along the first direction and process the information and load instructions from the program(s) stored in the memory. The loaded instructions, in this case, cause the portable electronic device to consecutively present a sequence of graphical representations of categories on the touch-sensitive display. As the contact is moved, different graphical representations of categories are presented and the portable electronic device may be regarded as being in category mode. In this way, many categories may be browsed with a single contact in a time efficient manner.

The portable electronic device is further configured to detect change in direction of the continuous movement of the contact from the first direction to a second direction, being different from the first direction. When this happens, instructions loaded from the program(s) in the memory of the portable electronic device, cause the portable electronic device to select the currently presented category, and consecutively present graphical representations of elements in the selected category on the touch-sensitive display. The portable electronic device may, thus, be regarded as being in element mode.

In summary, the programs of the portable electronic device according to the second aspect of the invention, when executed, cause the method according to the first aspect of the invention to be performed. Thus, the portable electronic device according to the second aspect of the invention can be controlled by means of the method according to the first aspect of the invention.

Thus, the portable electronic device allows browsing the categories and elements on the portable electronic device in a highly time efficient and convenient manner, as described above with reference to the first aspect of the invention.

The portable electronic device may be a multifunctional portable electronic device.

In this case the portable electronic device has many functions in that it may comprise, e.g., a global positioning system (GPS) unit, a compass, a calendar, an internet browser, a training logger, games, etc. This is particularly advantageous as a portable electronic device according to the second aspect of the invention allows for time efficient and convenient navigation between a multitude of applications and functions.

As an alternative, the portable electronic device may be a dedicated device having only a single function.

The portable electronic device may be a cell phone.

In this case, the portable electronic device comprises an antenna and means to record and emit sound in order to enable it to perform and receive phone calls, send and receive messages, etc. In order to allow time efficient and convenient use of cell phone functions, at least one category may be dedicated to include elements representing cell phone functions.

As an alternative, the portable electronic device may be a tablet, a watch, or any other suitable kind of portable electronic device comprising a touch-sensitive display.

The portable electronic device may comprise a touch-sensitive display which is divided into a content area for presenting content and a gesture area for performing continuous movement of a contact.

In this case, individual areas of the touch-sensitive display have individual functions. The content area may present content, e.g. in the form of graphical representations of categories and/or elements. The gesture area may detect the contact, continuous movement of the contact and possibly the end of the contact.

Accordingly, the touch-sensitive display may present content in an area different from the area used to register gestures in the form of contact on the touch-sensitive display. This is particularly advantageous in that areas may be arranged so that the user may perform gestures in the gesture area without blocking the content area.

The content area and the gesture area may be separate or non-overlapping, in which case the content area and the gesture area are arranged adjacent to each other or with a distance there between. As an alternative, the content area and the gesture area may be partly overlapping, in which case a part of the content area forms part of the gesture area, and vice versa.

The portable electronic device may further be adapted to provide tactile feedback.

In this case, the portable electronic device may provide tactile feedback in response to movement of the contact along the first direction and/or along the second direction, as described above with reference to the first aspect of the invention.

The portable electronic device may provide tactile feedback in response to change of direction of movement of contact from the first direction to the second direction and/or in response to change of direction of movement of contact from the second direction to the first direction.

The portable electronic device may further provide tactile feedback in response to a change in presented category and/or presented element.

By adapting the portable electronic device to provide tactile feedback, it is able to indicate receipt of user input by other means than visual output on the touch-sensitive display. This is particularly advantageous as the user can obtain feedback from the portable electronic device without the need to have visual contact with the touch-sensitive display. The user may also be able to associate the given user input with the received tactile feedback. This may allow the user to build up muscle memory, as described above. Once the user is familiarized with the combination of tactile feedback in response to particular user input, the user may be able to operate the portable electronic device in a somewhat automatic manner in which categories and elements may be browsed and selected in an even more time efficient and convenient manner.

The tactile feedback may be in the form of a vibration. This is particularly advantageous as many of the portable electronic devices today already comprise vibrators. Accordingly, it is a cost effective way of enabling tactile feedback. Furthermore, because vibrators are already used to provide tactical feedback in response to e.g. incoming phone calls and messages it may be relatively easy for the user to build up muscle memory in response to receipt of vibrational signals.

According to a third aspect, the invention provides a computer program product with instructions configured for execution by one or more processors, which when executed by a portable electronic device with a touch-sensitive display causes the portable electronic device to perform the method according to the first aspect of the invention.

Accordingly, the remarks set forth above with reference to the first and second aspects of the invention are equally applicable here.

According to the third aspect of the invention, a computer program product that includes instructions for a portable electronic device to perform the method according to the first aspect of the invention is provided. This is particularly advantageous as such a computer program product may be distributed in itself in order to be installed on portable electronic devices.

BRIEF DESCRIPTION OF THE DRAWINGS

The invention will now be described in further detail with reference to the accompanying drawings in which.

DETAILED DESCRIPTION OF THE DRAWINGS

Figure 1:
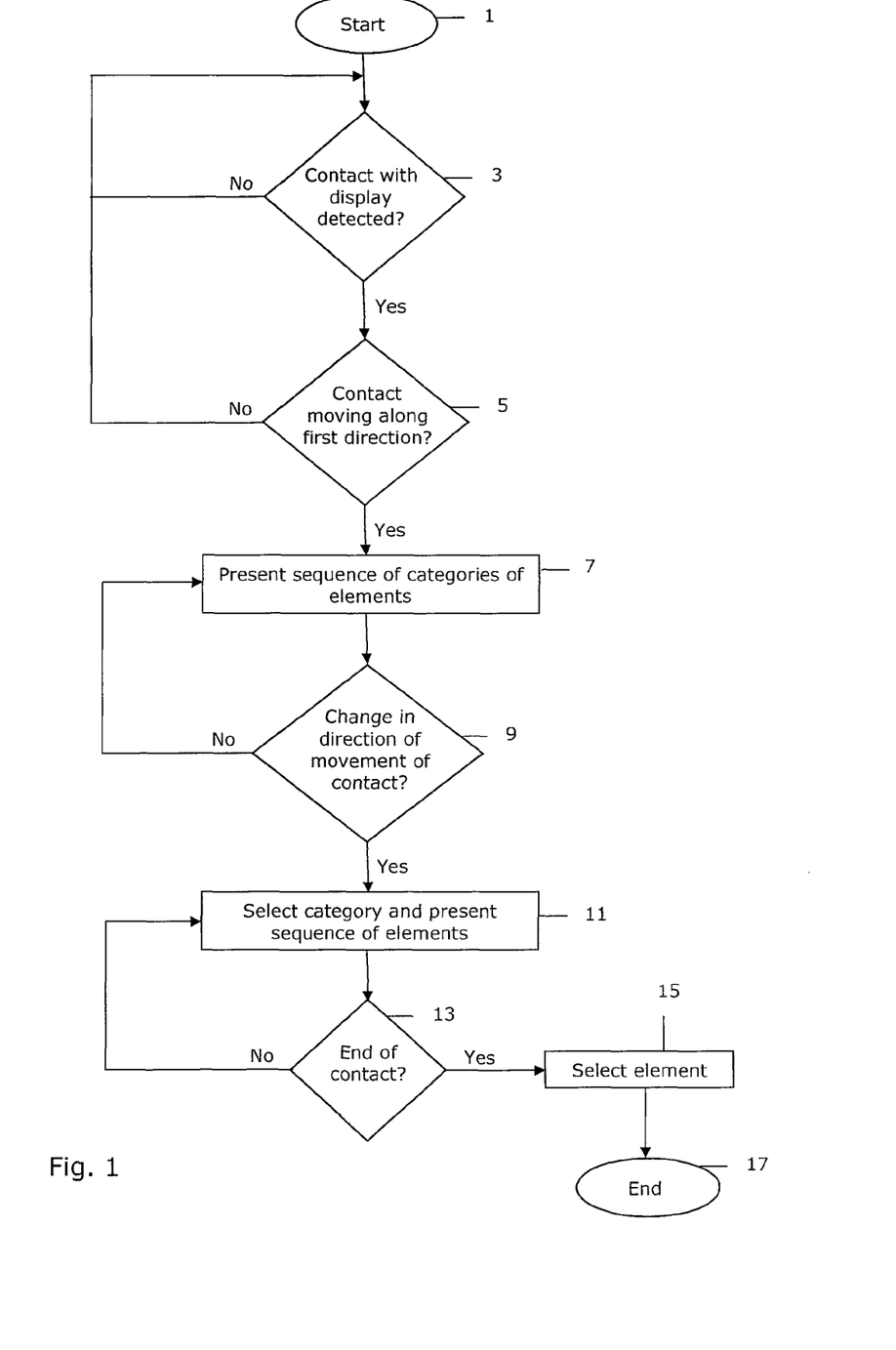
FIG. 1 is a flow chart illustrating a method according to an embodiment of the invention.

FIG. 1 is a flow chart illustrating a method according to an embodiment of the invention. The method is performed on a portable electronic device comprising a touch-sensitive display. The process is started at step 1. Next, the portable electronic device investigates whether or not contact with the touch-sensitive display is detected, at step 3, i.e. it is determined whether or not a user is contacting the touch-sensitive display. In the case that step 3 reveals that there is no contact with the touch-sensitive display, the process is returned to step 3 for continued investigation of whether or not a user contacts the touch-sensitive display.

In the case that step 3 reveals that contact with the touch-sensitive display is detected, the process is forwarded to step 5, in which the portable electronic device investigates whether or not continuous movement of the contact along a first direction is detected. If not, the process is returned to step 3 for continued investigation of whether or not a user contacts the touch-sensitive display.

In the case that step 5 reveals that continuous movement of the contact along a first direction is detected, the process is forwarded to step 7. At step 7, the portable electronic device consecutively presents a sequence of graphical representations of categories. Moreover, at step 7, the portable electronic device presents different categories as the contact is moved along the first direction. The portable electronic device may be regarded as being in category mode.

Then, at step 9, it is investigated whether or not a change in direction of the continuous movement of the contact from the first direction to a second direction is detected. The second direction is different from the first direction. In the case that step 9 reveals that a change in direction has not been detected, it is determined that the movement of the contact is still performed along the first direction, and the process is returned to step 7, where the consecutive presentation of categories of elements continues.

In the case that step 9 reveals that a change in direction has been detected, the process is forwarded to step 11. At step 11, the portable electronic device selects the currently presented category and consecutively presents a sequence of graphical representations of elements belonging to the selected category. Moreover, at step 11, the portable electronic device presents different elements as the contact is moved along the second direction. The portable electronic device may be regarded as being in element mode.

Then, at step 13, it is investigated whether or not the contact with the touch-sensitive display has ended. If not, the process is returned to step 11, where the consecutive presentation of elements is continued.

In the case that step 13 reveals that the continuous contact with the touch-sensitive display has ended, the portable electronic device selects the currently presented element at step 15. Finally, the process is ended at step 17.

In the case when the element selected at step 15 is an application or function, the portable electronic device executes, launches and/or presents that application or function. Thus, according to this embodiment, the computer implemented method allows the portable electronic device to execute, launch and/or present a specific application or function with just one contact on the touch-sensitive display. The portable electronic device may thereby be operated in a highly time efficient and convenient manner.

Figure 2:
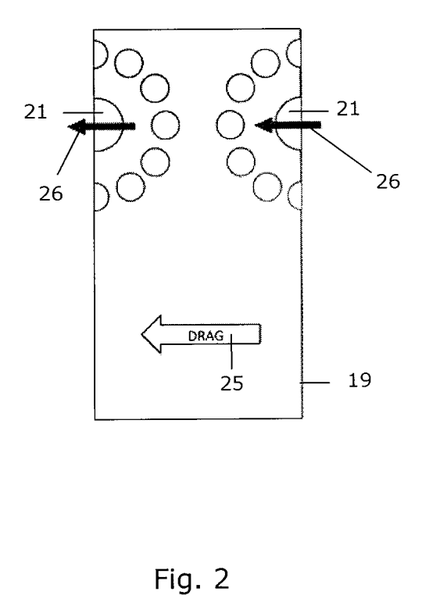
FIG. 2 is a schematic view of a portable electronic device according to an embodiment of the invention, illustrating change in presented category.

FIG. 2 is a schematic view of a portable electronic device according to an embodiment of the invention, comprising a touch-sensitive display 19 consecutively presenting a sequence of graphical representations of categories 21 of elements 23. The schematic view of FIG. 1 corresponds to a snap shot of the touch-sensitive display 19 during step 7 of the method described with reference to FIG. 1. In FIG. 2 continuous movement of contact is detected along a first direction, indicated by the arrow 25. In response to the detected movement, the portable electronic device consecutively presents different categories. In FIG. 2 the touch-sensitive display 19 is in an intermediate state between presenting two different categories 21. Arrows 26 illustrate the direction of movement of the displayed categories 21 across the touch-sensitive display 19, in response to the detected movement of the contact along the first direction 25.

Figure 3:
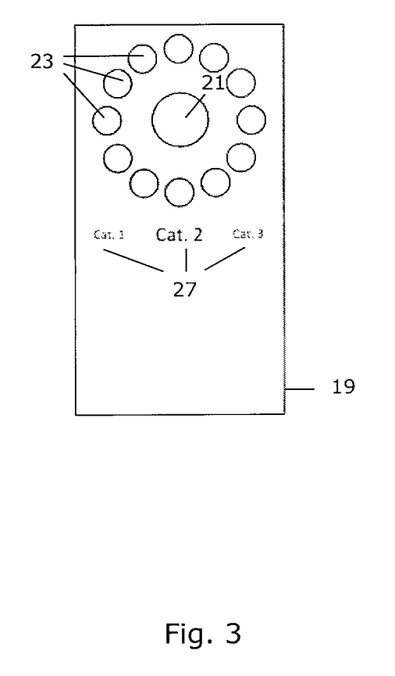
FIG. 3 is a schematic view of a portable electronic device according to an embodiment of the invention, illustrating presentation of a category.

FIG. 3 is a schematic view of a portable electronic device according to an embodiment of the invention. FIG. 3 illustrates selection of a category 21 by the portable electronic device. The situation corresponds to a snap shot of step 11 of the method described with reference to FIG. 1, in which a category 21 is selected in response to a detected change in direction of movement of contact from a first to a second direction. The second direction may, e.g., be an upwards direction of the touch-sensitive display 19, i.e. substantially perpendicular to the first direction illustrated in FIG. 2. A graphical representation of the category 21 is presented surrounded by graphical representations of elements 23 belonging to the category 21. Accordingly, the graphical representations of the elements 23 are arranged in a circular pattern. Below the graphical representation of the presented category 21, a written name 27 associated with the presented category 21 is presented along with written names 27 of the previous and subsequent categories.

Figure 4:
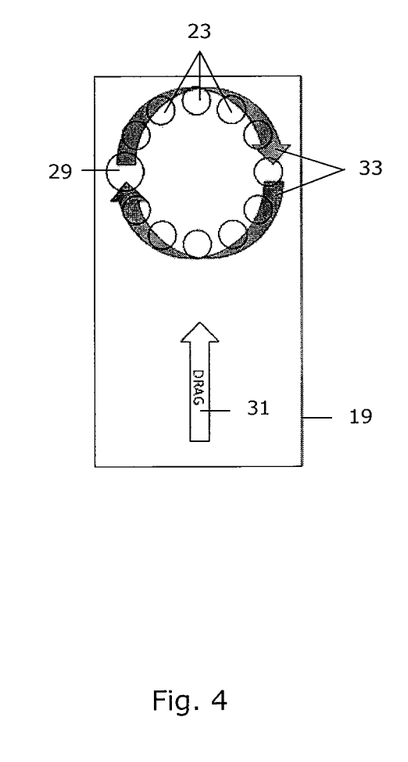
FIG. 4 is a schematic view of a portable electronic device according to an embodiment of the invention, illustrating change in presented element.

FIG. 4 is a schematic view of a portable electronic device according to an embodiment of the invention. FIG. 4 illustrates a touch-sensitive display 19 consecutively presenting a sequence of graphical representations of elements 23. The illustrated situation corresponds to a snap shot of the touch-sensitive display during step 11 of the method described with reference to FIG. 1, in which the portable electronic device is in element mode. In response to detected continuous movement of the contact along the second direction, the portable electronic device consecutively presents graphical representations of elements 23 belonging to the selected category. The currently presented element is highlighted by magnifying the graphical representation of the presented element 29. Detection of continuous movement of the contact in the second direction, indicated by arrow 31, causes the portable electronic device to circulate the graphical representations of elements 23 in the direction of the arrows 33. As graphical representations of elements 23 are circulated, different elements will be presented and thus different graphical representations of elements 23 will become magnified or enlarged.

Figure 5:
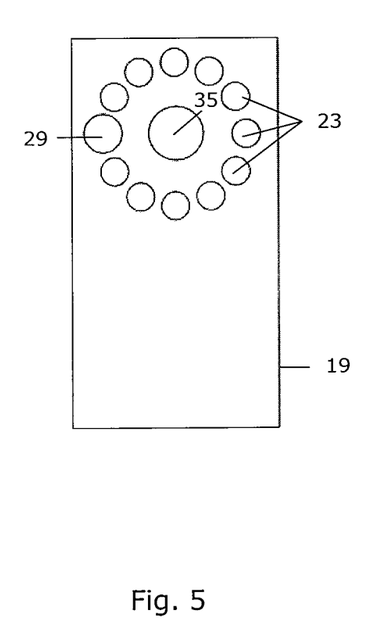
FIG. 5 is a schematic view of a portable electronic device according to an embodiment of the invention, illustrating selection of an element.

FIG. 5 is a schematic view of a portable electronic device according to an embodiment of the invention. FIG. 5 illustrates a touch-sensitive display 19 with the currently presented graphical representation of an element 29 highlighted by magnification or enlargement. The currently presented graphical representation of an element 29 is presented along with a written name associated with the element 29 at the position marked by a circle 35.

Figure 6:
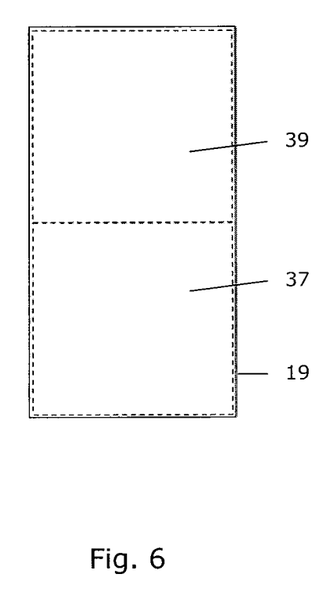
FIG. 6 is a schematic view of a portable electronic device according to an embodiment of the invention, illustrating different areas of a touch-sensitive display.

FIG. 6 is a schematic view of a portable electronic device according to an embodiment of the invention. FIG. 6 illustrates a touch-sensitive display 19 divided into a gesture area 37 and a content area 39. The content area 39 presents content, e.g. in the form of graphical representations of categories and/or elements. The gesture area 37 detects the contact, continuous movement of the contact and possibly the end of the contact. In the embodiment illustrated in FIG. 6, the gesture area 37 and the content area 39 are separate, i.e. non-overlapping.

Accordingly, the touch-sensitive display 19 may present content in an area different from the area used to register gestures in the form of contact on the touch-sensitive display 19. This is particularly advantageous in that areas may be arranged so that the user may perform gestures in the gesture area 37 without blocking the content area 39.

What is claimed is:

1. A computer-implemented method of controlling a portable electronic device comprising a touch-sensitive display, the method comprising the steps of:
   detecting contact with the touch-sensitive display,
   detecting continuous movement of the contact along a first direction,
   in response to the detected continuous movement of the contact along the first direction, the portable electronic device consecutively presenting a sequence of graphical representations of categories of elements on the touch-sensitive display,
   detecting a change in direction of the continuous movement of the contact from the first direction to a second direction being different from the first direction,
   in response to the detected change in direction of the continuous movement of the contact, the portable electronic device selecting a currently presented category of elements, and consecutively presenting a sequence of graphical representations of elements of the selected category on the touch-sensitive display,
   wherein the method further comprises the step of the portable electronic device providing tactile feedback in response to a change in currently presented category during continuous movement along the first direction and/or in response to a change in currently presented element during continuous movement along the second direction, the portable electronic device thereby providing consecutive tactile feedback corresponding to the consecutive presentation of the categories and/or elements on the touch-sensitive display, and wherein the method further comprises the steps of detecting end of continuous contact following detection of continuous movement of contact along the first direction and prior to detection of a change in direction of the continuous movement of the contact from the first direction to the second direction, and in response to the detected end of continuous contact, the portable electronic device selecting a currently presented category and presenting graphical representations of the elements of the selected category on the touch-sensitive display.

2. A computer-implemented method according to claim 1, further comprising the steps of detecting end of continuous contact following detection of continuous movement of contact along the second direction, and in response to the detected end of continuous contact, the portable electronic device selecting a currently presented element.

3. A computer-implemented method according to claim 1, further comprising the steps of detecting a change in direction of the continuous movement of the contact from the second direction to the first, and in response to the detected change in direction of the continuous movement of the contact, the portable electronic device consecutively presenting a sequence of graphical representations of categories of elements on the touch-sensitive display.

4. A portable electronic device comprising a touch-sensitive display, one or more processors, memory, and one or more programs, wherein the one or more programs are stored in the memory and configured to be executed by the one or more processors, the program(s) including instructions for:
   detecting contact with the touch-sensitive display,
   detecting continuous movement of the contact along a first direction,
   in response to the detected continuous movement of the contact along the first direction, consecutively presenting a sequence of graphical representations of categories of elements on the touch-sensitive display,
   detecting a change in direction of the continuous movement of the contact from the first direction to a second direction being different from the first direction,
   in response to the detected change in direction of the continuous movement of the contact, selecting a currently presented category of elements, and consecutively presenting a sequence of graphical representations of elements of the selected category on the touch-sensitive display,
   wherein the one or more programs further include instructions for the portable electronic device providing tactile feedback in response to a change in currently presented category during continuous movement along the first direction and/or in response to a change in currently presented element during continuous movement along the second direction, the portable electronic device thereby providing consecutive tactile feedback corresponding to the consecutive presentation of the categories and/or elements on the touch-sensitive display, and
   wherein the program(s) further include instructions for the portable electronic device detecting end of continuous contact following detection of continuous movement of contact along the first direction and prior to detection of a change in direction of the continuous movement of the contact from the first direction to the second direction, and in response to the detected end of continuous contact, the portable electronic device selecting a currently presented category and presenting graphical representations of the elements of the selected category on the touch-sensitive display.

5. A portable electronic device according to claim 4, wherein the portable electronic device is a multifunctional portable electronic device.

6. A portable electronic device according to claim 4, wherein the portable electronic device is a cell phone.

7. A portable electronic device according to claim 4, wherein the touch-sensitive display is divided into a content area for presenting content and a gesture area for performing continuous movement of a contact.

\* \* \* \* \*